(12) United States Patent
Hasegawa (10) Patent No.: US 8,368,268 B2
(45) Date of Patent: Feb. 5, 2013

(54) OPTICAL-DEVICE SWITCHING APPARATUS FOR MICROSCOPE

(75) Inventor: Kazuhiro Hasegawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 613 days.

(21) Appl. No.: 12/542,108

(22) Filed: Aug. 17, 2009

(65) Prior Publication Data

US 2010/0053742 A1  Mar. 4, 2010

(30) Foreign Application Priority Data

Aug. 28, 2008  (JP) .................................. 2008-220292

(51) Int. Cl.
*H02K 7/10*  (2006.01)
*H02K 7/06*  (2006.01)
*G02B 21/00*  (2006.01)

(52) U.S. Cl. ............. 310/75 R; 310/80; 310/83; 359/381
(58) Field of Classification Search ................ 310/75 R, 310/80, 83; 359/381
See application file for complete search history.

(56) References Cited

U.S. PATENT DOCUMENTS

| 3,171,212 A | * | 3/1965 | Michalec | .................... 33/501.13 |
| 2003/0164992 A1 | * | 9/2003 | Sakaguchi | .................... 358/475 |

FOREIGN PATENT DOCUMENTS

| JP | 64-019908 | | 1/1989 |
| JP | 05-281457 A | | 10/1993 |
| JP | 09-138354 A | | 5/1997 |
| JP | 2002310654 A | * | 10/2002 |
| JP | 2003-107363 A | | 4/2003 |

OTHER PUBLICATIONS

Machine Translation JP2002310654 (2002).*
Japanese Office Action dated Aug. 14, 2012 (and English translation thereof) in counterpart Japanese Application No. 2008-220292.

* cited by examiner

*Primary Examiner* — Quyen Leung
*Assistant Examiner* — Jose Gonzalez Quinones
(74) *Attorney, Agent, or Firm* — Holtz, Holtz, Goodman & Chick, PC (57) ABSTRACT

An optical-device switching apparatus of a microscope includes a driving motor, and a rotation unit that is rotatably attached to a body and to which optical devices are attached, and a gear apparatus that is located between the driving motor and the rotation unit and transmits power from the driving motor to the rotation unit. The gear apparatus includes a backlash reduction system that reduces backlash.

12 Claims, 6 Drawing Sheets

OPTICAL-DEVICE SWITCHING APPARATUS FOR MICROSCOPE

CROSS-REFERENCE TO RELATED APPLICATIONS

This application is based upon and claims the benefit of priority from Japanese Patent Application No. 2008-220292, filed on Aug. 28, 2008, the entire contents of which are incorporated herein by reference.

BACKGROUND OF THE INVENTION

1. Field of the Invention

The present invention relates to an optical-device switching apparatus of a microscope such as a revolver apparatus for switching objective lenses and a turret apparatus for switching mirror cubes.

2. Description of the Related Art

A revolver apparatus using a driving motor for switching objective lenses is described in Japanese Patent Application Laid-open No. H09-138354. The above revolver apparatus of a microscope includes a revolver body, a revolver rotator that is attached to the revolver body in a rotatable manner and includes a driving gear arranged near the periphery around a rotation axis, and a driving motor that rotates the revolver rotator using a power-transmission system. The driving motor is a step motor and controlled by a motor controller. A magnetic sensor probe, as a noncontact position detector, is fixed to the revolver body, and a position detection magnet is fixed to the revolver rotator. The number of the position-detection magnets corresponds to the number of lens-applied units. The position-detection magnet is fixed, keeping a fixed positional relation to the lens-applied unit that is formed on the revolver rotator.

In a rotor-plate switching apparatus of a microscope described in the above document, when a signal for positive rotation or negative rotation on of the revolver rotator is input to the motor controller, the motor controller outputs a driving pulse with a fixed frequency to rotate the driving motor at high speed so that the revolver rotator is rapidly rotated. Later, the frequency of the pulse is made low so that the driving motor is slowly rotated. During the low-speed rotation, the magnetic sensor probe detects the position-detection magnet, and then the revolver rotator stops rotating.

SUMMARY OF THE INVENTION

An optical-device switching apparatus of a microscope, according to one aspect of the present invention includes a driving motor, a rotation unit that is rotatably attached to a body and to which optical devices are attached, and a gear apparatus that is arranged between the driving motor and the rotation unit and transmits power from the driving motor to the rotation unit, and the gear apparatus including a backlash reduction system that reduces backlash.

An optical-device switching apparatus of a microscope, according to another aspect of the present invention includes a driving motor, a rotation unit that is rotatably attached to a body and to which optical devices are attached, a gear apparatus that is arranged between the driving motor and the rotation unit and transmits power from the driving motor to the rotation unit, and a backlash reduction system that applies a unidirectional rotative force to the rotation unit with the driving motor being inactive.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an optical-device switching apparatus of microscope in accordance with the present invention are described below with reference to the accompanying drawings. The invention, however, is not limited to the embodiments.

A revolver apparatus in a microscope that switches objective lenses is described first by way of an example. The optical device is not limited to an objective lens, and an optical-device switching apparatus is not limited to a revolver apparatus.

Figure 1:
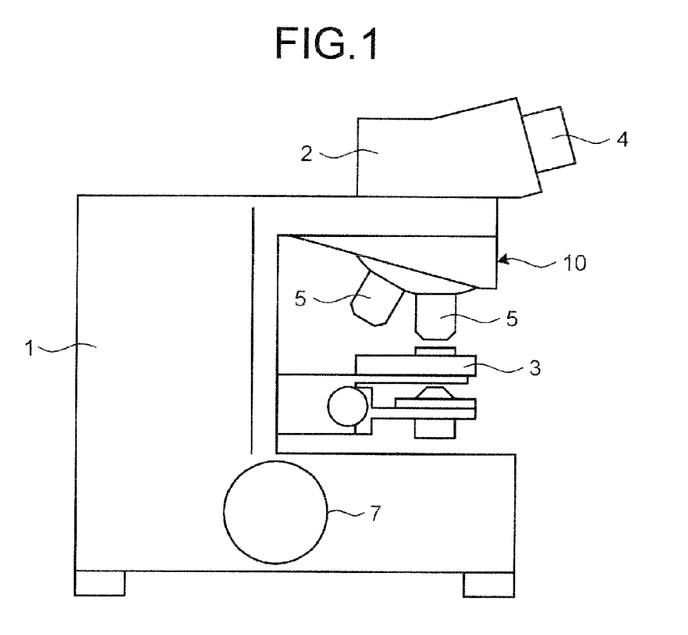
FIG. 1 is a left-side view of a microscope including a revolver apparatus in accordance with first and second embodiments of the present invention.

To begin with, referring to FIG. 1, an outline of a microscope including a revolver apparatus in accordance with first and second embodiments of the present invention is described. FIG. 1 is a left-side view of a microscope including the revolver apparatus in accordance with the first and second embodiments of the present invention.

As shown in FIG. 1, the microscope including the revolver apparatus in accordance with the first and second embodiments of the present invention includes a microscope body 1, a lens tube 2, and a stage 3. The lens tube 2 is attached to the tip end of an arm of the microscope body 1 so that an image is observed through an ocular lens 4. The stage 3 can be moved along right-left directions (X direction) or front-back directions (Y direction) or up-down directions (Z direction). By rotating a stage handle (not shown), the stage 3 can be moved along right-left directions (X direction) and front-back directions (Y direction). By using a targeting handle 7, the stage 3 can be moved along up-down directions.

Figure 2:
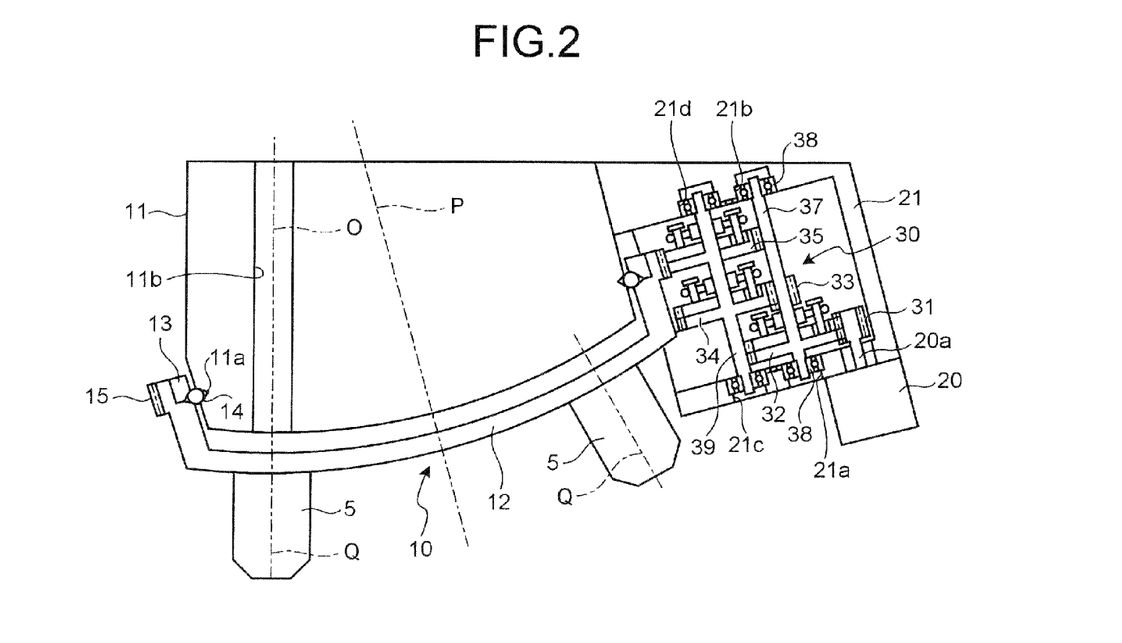
FIG. 2 is a side cross-sectional diagram of a mechanical configuration of the revolver apparatus in accordance with the first embodiment of the present invention.
Figure 3:
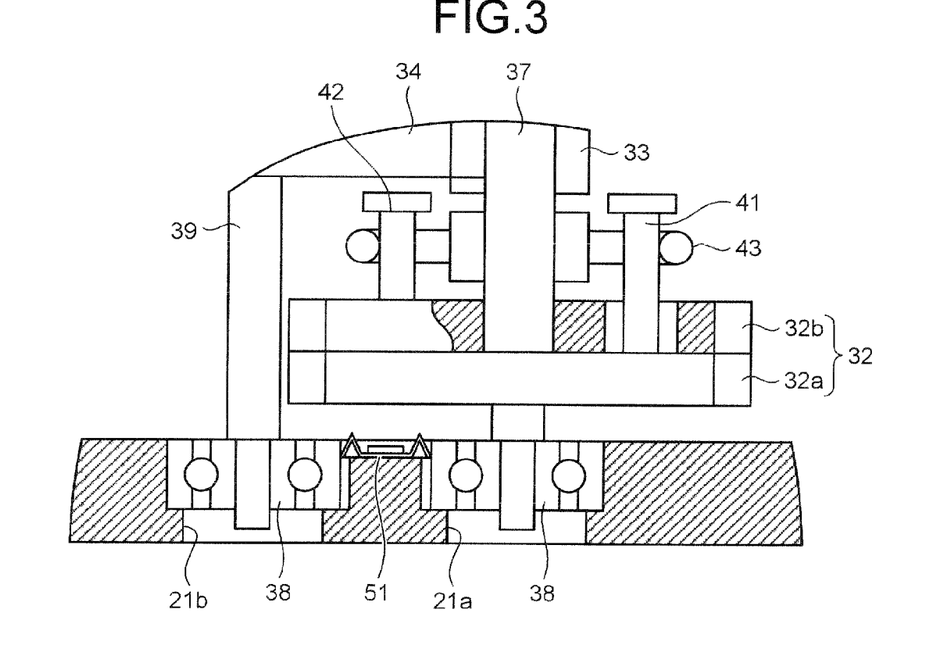
FIG. 3 is an enlarged view illustrating main parts of the revolver apparatus shown in FIG. 2.
Figure 4:
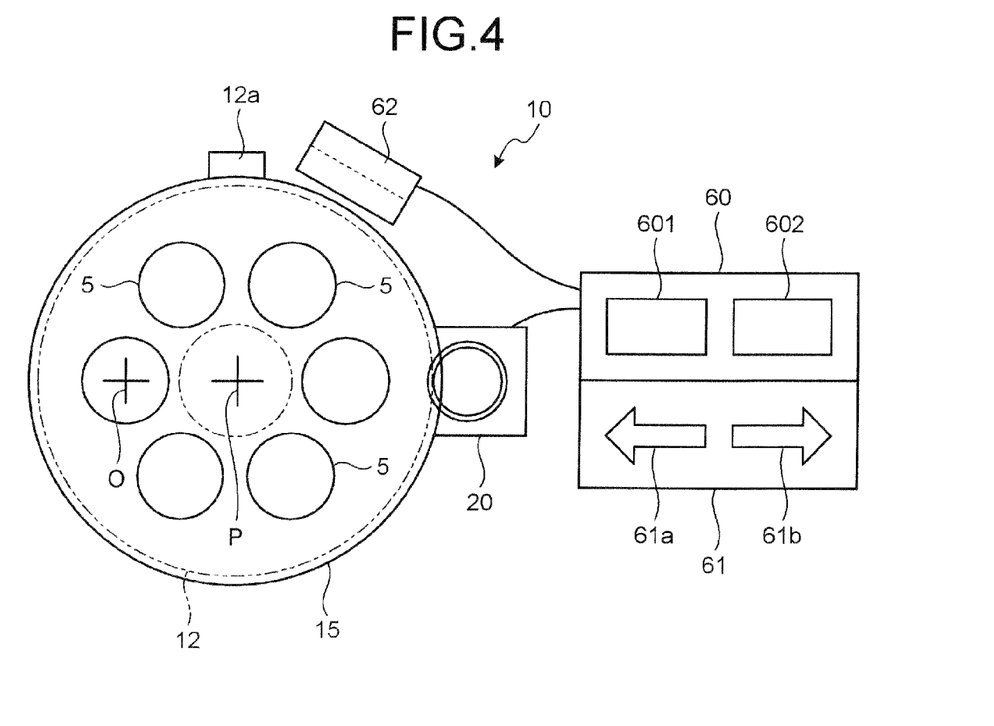
FIG. 4 is a conceptual diagram of an electric configuration of the revolver apparatus shown in FIG. 2.

Referring to FIGS. 2 to 4, a revolver apparatus in accordance with the first embodiment of the present invention is described. FIG. 2 is a side cross-sectional diagram of a mechanical configuration of the revolver apparatus in accordance with the first embodiment of the present invention. FIG. 3 is an enlarged view illustrating main parts of the revolver apparatus shown in FIG. 2. FIG. 4 is a conceptual diagram of an electric configuration of the revolver apparatus shown in FIG. 2.

A revolver apparatus 10 in accordance with the first embodiment of the present invention is a revolver apparatus called an electric revolver in which objective lenses 5 can be switched using a driving motor 20. As shown in FIG. 2, the revolver apparatus 10 includes a revolver body (fixed part) 11, a revolver rotator 12, the driving motor 20, and a gear apparatus 30.

The revolver body (fixed part) 11 is attached to a lower part of the tip end of the arm included in the microscope body 1. A lower part of the revolver body 11 is a sloping cylinder shape. The lower surface of the revolver body 11 is a downward-convex spherical surface. The outer circumference of the lower part of the revolver body 11 has a V-shaped groove 11a, whose cross section is V-shaped, around the whole circumference. Two sloping surfaces constituting the V-shaped groove 11a intersect at 90 degrees. The two sloping surfaces serve as a track surface of a ball 14 described later.

The revolver body 11 includes an optical path 11b, through which observation light transmitted through the objective lens 5 leads to the ocular lens 4 via the lens tube. FIG. 2 shows the optical axis O of the observation light observed at the ocular lens 4.

The revolver rotator 12 has a concave part on its upper surface. An "A" unit 13 is attached to the inner circumference of the upper part of the revolver rotator 12. The "A" unit 13 is a ring shape. Sloping surfaces are constituted both on the whole inner circumference of a joint surface of the "A" unit 13 and the whole inner circumference of a joint surface of the revolver rotator 12 to which the "A" unit 13 is attached. When the "A" unit 13 is attached to the revolver rotator 12, the two sloping surfaces constitute a V-shaped groove, whose cross section is V-shaped. The two sloping surfaces constituting the V-shaped groove intersect at 90 degrees. The two sloping surfaces serve as a track surface of the ball 14 described later.

The revolver rotator 12 configured as above is attached to the revolver body 11 by attaching the "A" unit 13 to the revolver rotator 12 in a manner such that the ball 14 is located between the revolver rotator 12 and the revolver body 11. Thus, the revolver rotator 12 can be rotated around the revolver body 11.

The lower surface of the revolver rotator 12 is a downward-convex spherical surface, to which the plurality of objective lenses 5 are attached. Six objective lenses are attached to the revolver rotator 12 of the revolver apparatus 10 in accordance with the first embodiment. Specifically, screw holes (not shown) are formed at regular intervals and at positions in the same radius from the rotation axis P of the revolver rotator 12 so that the objective lenses 5 can be attached. Therefore, when the revolver rotator 12 is rotated one-sixth revolution in the clockwise (CW) direction or the counter clockwise (CCW) direction, the objective lenses 5 are switched.

Furthermore, a driven gear 15 is formed on the outer circumference of the revolver rotator 12. The number of teeth of the driven gear 15 is divisible by the number of attached objective lenses 5. In the first embodiment, the number of teeth constituted is 240, which is divisible by six.

Furthermore, the driving motor 20 is attached to the revolver body 11 with a frame 21 interposed inbetween. The driving motor 20 is a hybrid-type step motor that rotates in synchronization with pulse voltage. In the first embodiment, a step angle is 1.8 degrees and thus an output shaft 20a is rotated one complete revolution per 200 steps (pulses).

The gear apparatus 30 is arranged between the driving motor 20 and the revolver rotator 12. The gear apparatus 30 transmits power from the driving motor 20 to the revolver rotator 12 (driven gear 15) and is arranged inside the frame 21. The gear apparatus 30 includes gears 31, 32, 33, 34, 35, and (15) and transmits the rotation of the driving motor 20 to the revolver rotator 12 at reduced rotation speed. Specifically, the gear apparatus 30 includes a motor gear 31, a first main gear 32, a first small gear 33, a second main gear 34, and an output gear 35.

The motor gear 31 is attached to the output shaft 20a of the driving motor 20. Specifically, the motor gear 31 is a spur gear having ten teeth.

The first main gear 32 is engaged with the motor gear 31. Specifically, the first main gear 32 is a spur gear having forty teeth. Therefore, when the motor gear 31 is rotated one revolution, the first main gear 32 is rotated one-fourth revolution. When the motor gear 31 is rotated four revolutions, the first main gear is rotated one revolution (thus speed slows down to one-fourth). The same teeth of the first main gear 32 are engaged with the same teeth of the motor gear 31, respectively. The first main gear 32 is attached to a first slowdown shaft 37. The first main gear 32 is rotated together with the first slowdown shaft 37.

The first slowdown shaft 37 is a stepped shaft whose both ends are narrow and is supported by the frame 21 rotatably. Specifically, stepped holes 21a and 21b containing radial bearings 38 are made in the frame 21 that supports the first slowdown shaft 37. The ends of the first slowdown shaft 37 are pressed into the inner rings of the radial bearings 38 contained in the stepped holes 21a and 21b (interference fit).

The first small gear 33 rotates in the same manner with the first main gear 32. Specifically, the first small gear 33 is a spur gear having ten teeth. The first small gear 33 is attached to the first slowdown shaft 37, similarly to the first main gear 32. The first small gear 33 rotates together with the first slowdown shaft 37.

The second main gear 34 is engaged with the first small, gear 33. Specifically, the second main gear 34 is a spur gear having forty teeth. Therefore, when the first small gear 33 is rotated one revolution, the second main gear 34 is rotated one-fourth revolution. When the first small gear 33 is rotated four revolutions, the second main gear 34 is rotated one revolution (thus speed slows down to one-fourth). The same teeth of the second main gear 34 are engaged with the same teeth of the first small gear 33, respectively. The second main gear 34 is attached to a second slowdown shaft 39. The second main gear 34 is rotated together with the second slowdown shaft 39.

Similarly to the first slowdown shaft 37, the second slowdown shaft 39 is a stepped shaft whose both ends are narrow and is rotatably supported by the frame 21. Specifically, stepped holes 21c and 21d containing the radial bearings 38 are made in the frame 21 that supports the second slowdown shaft 39. The ends of the second slowdown shaft 39 are pressed into the inner rings of the radial bearings 38 contained in the stepped holes 21c and 21d (interference fit).

The output gear 35 is rotated in the same manner as the second main gear 34 and is engaged with the driven gear 15. Specifically, the output gear 35 is a spur gear having forty teeth. Therefore, when the output gear 35 is rotated one revolution, the driven gear 15 (the revolver rotator 12) is rotated one-sixth revolution (thus speed slows down to one-sixth) so that the objective lens 5 is switched to the adjacent objective lens 5. Furthermore, when the output gear 35 is rotated six revolutions, the driven gear 15 (the revolver rotator 12) is rotated one revolution. The same teeth of the driven gear 15 are engaged with the same teeth of the output gear 35, respectively. Similarly to the second main gear 34, the output gear 35 is attached to the second slowdown shaft 39. The output gear 35 is rotated together with the second main gear 34.

When the motor gear 31 is rotated sixteen revolutions in the gear apparatus 30 described above, the first main gear 32 and the first small gear 33 are rotated four revolutions, the second main gear 34 and the output gear 35 are rotated one revolution, and the driven gear 15 (the revolver rotator 12) is rotated one-sixth revolution, so that the objective lens 5 is switched to the adjacent objective lens 5.

Furthermore, the gear apparatus 30 includes a backlash reduction system that reduces backlash. The backlash reduced is looseness between tooth surfaces of a pair of engaged gears (the motor gear 31 and the first main gear 32, the first small gear 33 and the second main gear 34, or the output gear 35 and the driven gear 15) and looseness between the inner ring and the outer ring of the radial bearing 38.

Firstly, the backlash reduction system that reduces looseness between tooth surfaces of a pair of engaged gears is described. In the backlash reduction system, at least one of the gears of the gear apparatus 30 includes two gears stacked one on another and one of the stacked gears is shifted along a rotation direction. In the first embodiment, this backlash reduction system is applied to the first main gear 32, the second main gear 34, and the output gear 35. As shown in FIG. 3, the first main gear 32, for example, includes a fixed gear 32a that is fixed to the first slowdown shaft 37, and a rotating gear 32b that has the same configuration as the fixed gear 32a and can be rotated around the first slowdown shaft 37. Connection pins 41 and 42 arranged upright in the respective gears are linked together with an elastic component 43 (e.g., tension coiled spring). The elastic component 43 is set so that greater force than resisting force by the revolver rotator 12 being rotated and moment of the objective lens 5 attached to the revolver rotator 12 works. The elastic component 43 reduces looseness with the teeth surface of a paired, engaged gear (e.g., the motor gear 31, the first small gear 33, and the driven gear 15).

Secondly, the backlash reduction system that reduces looseness between the inner ring and outer ring of the bearing is described. The backlash reduction system presses the first and second slowdown shafts 37 and 39 into the inner rings of the radial bearings 38 and applies force to the outer ring of the radial bearing 38 in a radial direction. For example, as shown in FIG. 3, the backlash reduction system includes an elastic component (e.g., plate spring) 51 that is located and screwed on a groove between the outer ring of the radial bearing 38 supporting the first slowdown shaft 37 and the outer ring of the radial bearing 38 supporting the second slowdown shaft 39. The elastic component 51 applies force to the radial bearing 38 supporting the first slowdown shaft 37 and the radial hearing 38 supporting the second slowdown shaft 39 in such directions that the radial bearings 38 are urged to be separated. Being preloaded by the urging force, the outer ring of the radial bearing 38 changes its shape elastically. Thus, looseness between the inner ring and the outer ring of each of the radial bearings 38 is reduced.

The revolver apparatus 10 of the microscope configured as above is controlled by a controller 60 as shown in FIG. 4. The controller 60 includes an input unit 61 and is connected with an origin-point sensor 62 and with the driving motor 20 described above. The input unit 61 receives inputs of commands for a switching operation of the objective lenses 5. As shown in FIG. 4 the input unit 61 includes a pair of arrow keys 61a and 61b. The origin-point sensor 62 detects an origin point that is used as reference as to where the revolver rotator 12 is stopped. Specifically, the origin-point sensor 62 is a photo interrupter. The origin-point sensor 62 uses as reference a light-blocking plate 12a attached to the revolver rotator 12 and regards as an origin point a position where the light is blocked by the light-blocking plate 12a.

Furthermore, the controller 60 includes a calculator 601 and a storage 602. The calculator 601 calculates the number of steps (the number of pulses) to be output to the driving motor 20. The storage 602 stores the number of steps (the number of pulses) that have been output to the driving motor 20. Specifically, the storage 602 stores the number of steps, regarding steps for rotating the driving motor 20 in the counterclockwise direction as positive and steps for rotating the driving motor 20 in the clockwise direction as negative. The calculator 601 identifies a current position based on the number of steps stored in the storage 602 and controls the driving motor 20 based on the number of steps calculated.

As for the number of steps for switching the objective lenses 5, the number of steps required from the origin point until the optical axis Q of the objective lens 5 reaches the observation optical axis O is measured before the shipment of the microscope and the measured number is adopted. In this manner, mechanical fluctuation, e.g., fluctuation in engagement of gears, can be avoided so that objective lenses can be properly switched.

When the revolver apparatus 10 of the microscope described above is turned on, the controller 60 starts an initializing process. The initializing process is performed so that a position where the revolver rotator 12 is stopped corresponds to the number of steps stored in the storage 602. The calculator 601 rotates the revolver rotator 12 in the clockwise direction and regards as the origin point the position where the origin-point sensor 62 detects the light-blocking plate 12a. Then, the calculator 601 assigns zero to the number of steps stored in the storage 602. The rotation speed of the driving motor 20 during the initializing process is lower than the rotation speed in switching the objective lenses 5 so that fluctuation in the position detected by the origin-point sensor 62 is suppressed and thus detection accuracy is improved.

When the initializing process is completed, the revolver apparatus 10 of the microscope is switched to a normal operation mode, in which the calculator 601 switches the objective lenses 5 according to an input from the input unit 61. The driving motor 20 is driven according to the operation of the arrow keys 61a and 61b so that the revolver rotator 12 is rotated.

When the arrow keys 61a and 61b are operated, the calculator 601 calculates difference between the number of steps stored in the storage 602 and the number of steps corresponding to a switching command, outputs the difference to the driving motor 20, and stores the number of steps corresponding to the switching command in the storage 602. The driving motor 20 is rotated by the number of steps being input and then stops (open-loop control).

According to the revolver apparatus 10 of the microscope described above, the backlash reduction system that reduces looseness between tooth surfaces of a pair of engaged gears is applied to the first main gear 32, the second main gear 34, and the output gear 35, so that the looseness between tooth surfaces in the gear apparatus 30 is reduced as much as possible. Furthermore, the position where the revolver rotator 12 stops is not deviated due to load caused by the revolver rotator 12 and the objective lenses 5.

Furthermore, the backlash reduction system that reduces looseness between the inner ring and the outer ring of the radial bearing 38 is applied to the first slowdown shaft 37 and the second slowdown shaft 39, so that the looseness between the inner ring and the outer ring of the radial bearing 38 in the gear apparatus 30 is reduced. As a result, shaking of the first slowdown shaft 37 and the second slowdown shaft 39 can be suppressed, and the radial bearing 38 becomes more rigid.

Furthermore, the number of steps required from the origin point until the optical axis Q of the objective lens 5 reaches the observation optical axis O is measured before the shipment of the microscope. According to this number, the objective lenses 5 are switched, so that mechanical fluctuation, e.g., fluctuation in engagement of gears, can be avoided and the objective lenses can be properly switched.

Furthermore, the driving motor 20 is rotated by the number of steps that is input and then stops. In this manner, it is not required to detect a stopping position with the slow-speed rotation of the driving motor 20, and therefore the objective lenses 5 can be switched (i.e., the revolver rotator can be rotated) at high speed.

A revolver apparatus (real one) of a microscope not including the backlash reduction system described above causes approximately 20 µm of lost motion (i.e., repeatability in position determining directions). In contrast, a revolver apparatus (real one) of the microscope including the backlash reduction system that reduces looseness between tooth surfaces is demonstrated to cause approximately 5 µm of lost motion. Furthermore, a revolver apparatus (real one) of the microscope further including the backlash reduction system that reduces looseness between the inner ring and the outer ring of the bearing is demonstrated to cause approximately 1 µm of lost motion.

Figure 5:
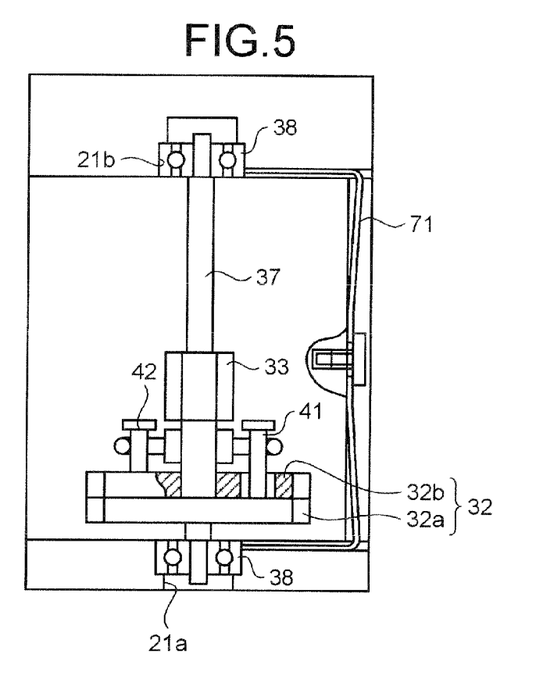
FIG. 5 is a side cross-sectional diagram of main parts of a backlash reduction system, which reduces looseness between an inner ring and an outer ring of a bearing, in accordance with a first variation.

A revolver apparatus in which the backlash reduction system that reduces looseness between the inner ring and outer ring of the bearing is modified is described with reference to FIG. 5. FIG. 5 is a side cross-sectional diagram of main parts of a backlash reduction system that reduces looseness between the inner ring and outer ring of the bearing in accordance with a first variation. Other than the backlash reduction system that reduces looseness between the inner ring and outer ring of the bearing, the revolver apparatus is identical with the revolver apparatus 10 in accordance with the above embodiment.

As shown in FIG. 5, the backlash reduction system that reduces looseness between the inner ring and outer ring of the bearing in accordance with the first variation includes a pressing component 71 that presses, at once, the outer rings of the two radial bearings 38 that respectively support one end and another end of the first slowdown shaft 37. The pressing component 71 is a plate-shaped component (e.g., plate spring) that is bended to be a rectangular shape having an open side. The middle of the pressing component 71 is screwed onto the frame so that the pressing component 71 presses the two radial bearings 38 at once. The radial bearings 38 are preloaded due to this pressing force, and the outer rings of the radial bearings 38 change their shapes elastically, so that looseness between the inner ring and the outer ring of each radial bearing 38 is reduced.

According to the backlash reduction system, looseness between the inner ring and the outer ring of the radial bearing 38 in the gear apparatus 30 is reduced. Therefore, shaking of the first slowdown shaft 37 can be suppressed and the radial bearing 38 becomes more rigid.

Although not shown in FIG. 5, it is preferable that the backlash reduction system be applied to the second slowdown shaft 39 to press at once the two radial bearings 38 that respectively support one end and another end of the second slowdown shaft 39.

Figure 6:
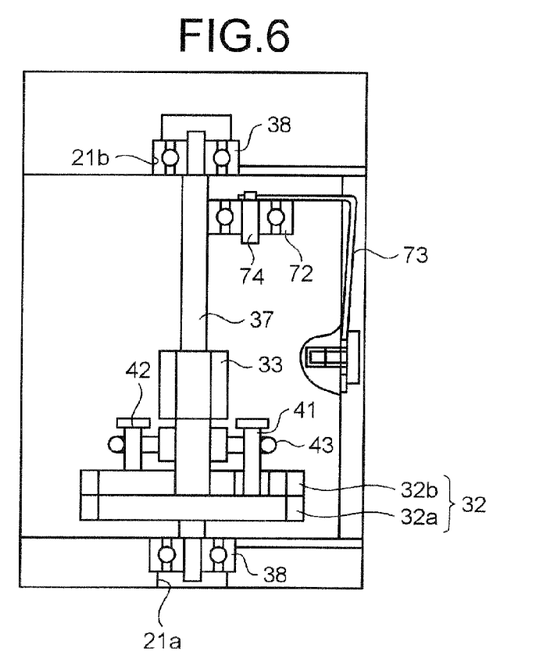
FIG. 6 is a side cross-sectional diagram of main parts of a backlash reduction system, which reduces looseness between an inner ring and an outer ring of a bearing, in accordance with a second variation.

A revolver apparatus including a backlash reduction system that reduces looseness between the inner ring and the outer ring of the bearing is described with reference to FIG. 6. FIG. 6 is a side cross-sectional diagram of main parts of a backlash reduction system that reduces looseness between the inner ring and the outer ring of the bearing in accordance with a second variation. Other than the backlash reduction system that reduces looseness between the inner ring and the outer ring of the bearing, the revolver apparatus is identical with the revolver apparatus 10 in accordance with the above embodiment.

As shown in FIG. 6, the backlash reduction system that reduces looseness between the inner ring and the outer ring of the bearing in accordance with the second variation presses shafts (the first slowdown shaft 37, and the second slowdown shaft 39) and includes a pressing component 73 whose tip end rotatably supports a bearing 72. The pressing component 73 is a plate-shaped component (e.g., plate spring) that is bended in an L-shape. A shaft 74 is attached to the tip end of the pressing component 73, and the bearing 72 is rotatably attached to the shaft 74. The base end of the pressing component 73 is screwed onto the frame 21 so that the first slowdown shaft 37 is pressed. The radial bearing 38 is preloaded due to this pressing force so that looseness between the inner ring and the outer ring of each of the radial bearings 38 is reduced.

According to the backlash reduction system, looseness between the inner ring and the outer ring of the radial bearing 38 in the gear apparatus 30 is reduced. Therefore, shaking of the first slowdown shaft 37 is suppressed, and the radial bearing 38 becomes more rigid.

Although not shown in FIG. 6, it is preferable that the backlash reduction system be applied to the second slowdown shaft 39 to press the second slowdown shaft 39.

Figure 7:
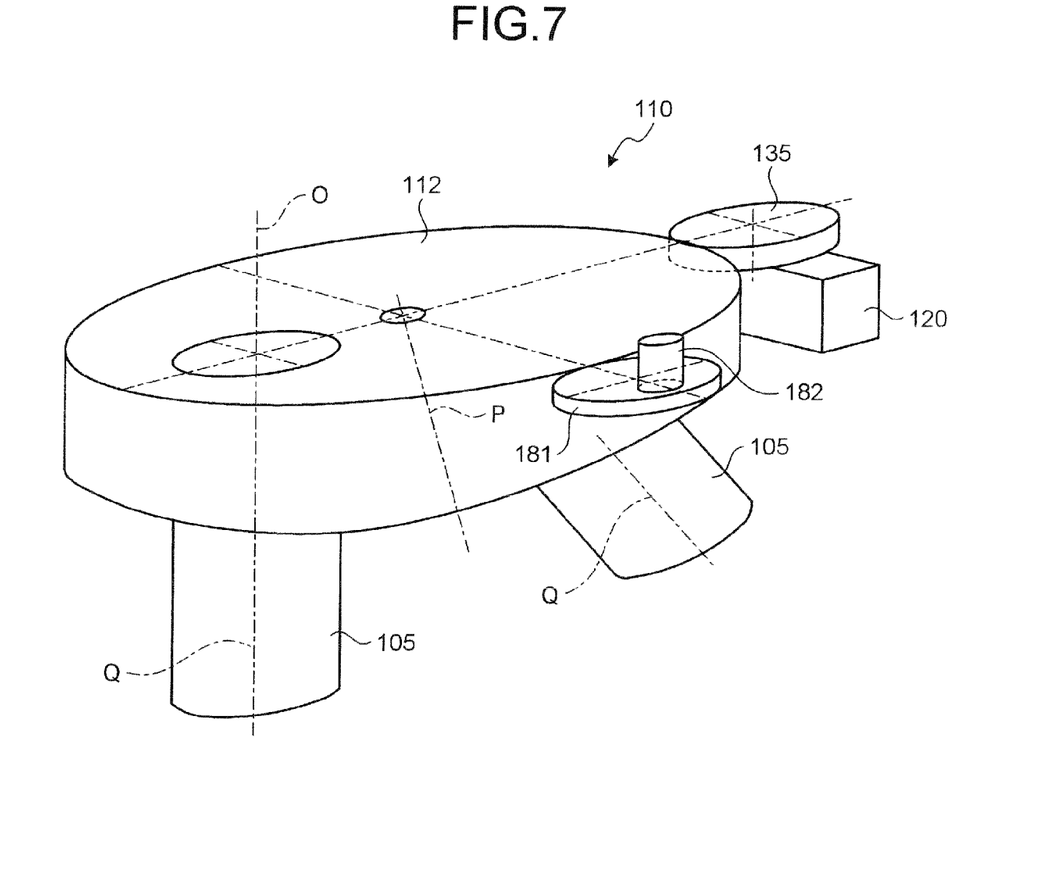
FIG. 7 is a perspective view of an outline of a revolver apparatus in accordance with a second embodiment of the present invention.

A revolver apparatus in accordance with a second embodiment is described with reference to FIG. 7. FIG. 7 is a perspective view of an outline of a revolver apparatus in accordance with the second embodiment of the present invention.

As shown in FIG. 7, a revolver rotator 112 in the revolver apparatus in accordance with the second embodiment of the present invention is rotatable and a rotation axis P of the revolver rotator 112 is tilted by fifteen degrees. Furthermore, a plurality of objective lenses 105 are attached to the revolver rotator 112. Six objective lenses 105 are attached to the revolver rotator 112 in the revolver apparatus in accordance with the second embodiment. Specifically, screw holes (not shown), to which the objective lenses 105 are attached, are formed at regular intervals and at positions in the same radius from the rotation axis P of the revolver rotator 112. Therefore, when the revolver rotator 112 is rotated one-sixth revolution in the clockwise (CW) direction or in the counterclockwise (CCW) direction, the objective lenses 105 are switched.

Furthermore, a driven gear (not shown) is formed on the outer circumference of the revolver rotator 112. The number of teeth of the driven gear is divisible by the number of attached objective lenses. In the second embodiment, the number of teeth is 240, which is divisible by six.

The revolver rotator 112 can be rotated by a driving motor 120. A gear apparatus (slowdown apparatus) (not shown) is arranged between the revolver rotator 112 and the driving motor 120. The gear apparatus slows down power input by the driving motor 120 and transmits the power to the revolver rotator 112 (driven gear). The gear apparatus contains a slowdown gear and includes an output gear 135 at the output shaft. The output gear 135 is engaged with the driven gear.

With one revolution, the output gear 135 can switch the objective lenses 105. In detail, the output gear 135 is a spur gear having forty teeth. When the output gear 135 is rotated one revolution, the driven gear (the revolver rotator 112) is rotated one-sixth revolution (thus speed slows down to one-sixth) and the objective lens 105 is switched to the adjacent objective lens 105. Furthermore, when the output gear 135 is rotated six revolutions, the driven gear (the revolver rotator 112) is rotated one revolution, so that the same teeth of the output gear 135 are engaged with the same teeth of the driven gear, respectively.

Furthermore, a revolver apparatus 110 in accordance with the second embodiment includes a backlash reduction system that applies unidirectional rotative force to the revolver rotator 112 while the driving motor 120 is inactive.

The backlash reduction system is a gear 181 (hereinafter, "rotative force generating gear 181") that applies, when the objective lenses 105 are switched, unidirectional rotative force to the revolver rotator 112. As shown in FIG. 7, the rotative force generating gear 181, being tilted, is engaged with the driven gear. The rotative force generating gear 181 is tilted by fifteen degrees similarly to the driven gear (the revolver rotator 112) and stops at the same position when the objective lenses 105 are switched. The rotative force generating gear 181 is a spur gear having forty teeth. When the driven gear is rotated one-sixth revolution and the objective lens 105 is switched to an adjacent one, the rotative force generating gear 181 is rotated one revolution and stops at the same position. Furthermore, when the rotative force generating gear 181 is rotated six revolutions, the driven gear (the revolver rotator 112) is rotated one revolution. Therefore, the same teeth of the driven gear are engaged with the same teeth of the rotative force generating gear 181, respectively.

The rotative force generating gear 181 is provided with a weight 182 that generates unidirectional rotative force. The weight 182 is arranged at a position away from the rotation center of the rotative force generating gear 181. When the objective lenses 105 are switched, the weight 182 generates rotative force for the rotative force generating gear 181. The rotative force generating gear 181 is engaged with the driven gear (the revolver rotator 112), which is stopped at the switching position, in a manner such that the weight 182 is located midway between the top dead center and the bottom dead center.

As described, the rotation axis of the rotative force generating gear 181 is tilted by fifteen degrees, and the rotative force generating gear 181 is engaged with the driven gear, which is stopped at the switching position, in a manner such that the weight 182 is located midway between the top dead center and the bottom dead center. Therefore, gravity force of the weight 182 is applied to the rotative force generating gear 181 in an inward-radial direction (i.e. toward the rotation axis) (component force 1) and, furthermore, applied in a circumferential direction (i.e., in the rotating direction) (component force 2). Therefore, when the rotative force generating gear 181 is in such a position that the weight 182 is located midway between the top dead center and the bottom dead center, the rotative force for rotating the revolver rotator 112 in one direction (i.e., component force 2) is applied to the rotative force generating gear 181.

Similarly to the first embodiment described above, the revolver apparatus in accordance with the second embodiment described above performs an initializing process and then normal operations, in which the driving motor 120 stops after the rotation by the number of steps required for switching the objective lenses 105, and the rotative force generating gear 181 is stopped at such a position that the weight 182 is located midway between the top dead center and the bottom dead center.

Then, unidirectional rotative force is generated in the rotative force generating gear 181 by the weight 182, and this rotative force is applied to the revolver rotator 112, which is then rotated in the other direction. If backlash allowing the revolver rotator 112 to be rotated in the other direction is caused between the output gear 135 and the revolver rotator 112, the rotative force generating gear 181 being rotated in one direction causes the revolver rotator 112 to be rotated in the other direction idly. As a result, the teeth of the driven gear touch the teeth of the output gear 135.

For example, suppose a case where rotative force for rotating the rotative force generating gear 181 in the clockwise (CW) direction is generated and applied to the rotative force generating gear 181 by the weight 182. This rotative force serves to rotate the revolver rotator 112 in the counterclockwise (CCW) direction. Therefore, if backlash allowing the revolver rotator 112 to be rotated in the counterclockwise (CCW) direction is caused between the output gear 135 and the revolver rotator 112, the rotative force generating gear 181 being rotated in the clockwise (CW) direction causes the revolver rotator 112 to be rotated in the counterclockwise direction idly. As a result, the teeth of the driven gear touch the teeth of the output gear 135.

When the objective lens 105 is switched to an adjacent one, the rotative force generating gear 181 is rotated one revolution and is stopped at the same position. Therefore, the direction of force applied to the rotative force generating gear 181 is consistent unless the engagement between the driven gear and the rotative force generating gear 181 is changed.

When the driving motor 120 is driven and makes the output gear 135 rotate in the counterclockwise direction in the revolver apparatus 110 in accordance with the second embodiment described above, the revolver rotator 112 is rotated in the clockwise direction. Therefore, it can be assumed that there is backlash between the output gear 135 and the revolver rotator 112 allowing the revolver rotator 112 to be rotated in the clockwise direction only. However, when the weight 182 applies rotative force for the clockwise rotation to the rotative force generating gear 181 as described in the above example, the revolver rotator 112 is not rotated in the clockwise direction. Therefore, in this case, the backlash is negligible.

When the driving motor 120 is driven and makes the output gear 135 rotate in the clockwise direction, the revolver rotator 112 is rotated in the counterclockwise direction. Therefore, it can be assumed that there is backlash between the output gear 135 and the revolver rotator 112 that allows the revolver rotator 112 to be rotated in the counterclockwise direction only. When the weight 182 applies rotative force for the clockwise rotation to the rotative force generating gear 181 as in the above example, the revolver rotator 112 is rotated according to the backlash. The revolver rotator 112, which is rotated according to the backlash, is stopped at the same position as a position in a case where the driving motor 120 is driven and makes the output gear 135 rotate in the counterclockwise direction.

As described, the revolver apparatus in accordance with the second embodiment described above can prevent the problem in that the revolver rotator is stopped at different positions depending on the rotation direction of the driving motor 120.

A turret apparatus, in a microscope, for switching mirror cubes is described below by way of an example. It should be noted that the optical devices are not limited to mirror cubes, and the optical-device switching apparatus is not limited to a turret apparatus.

Figure 8:
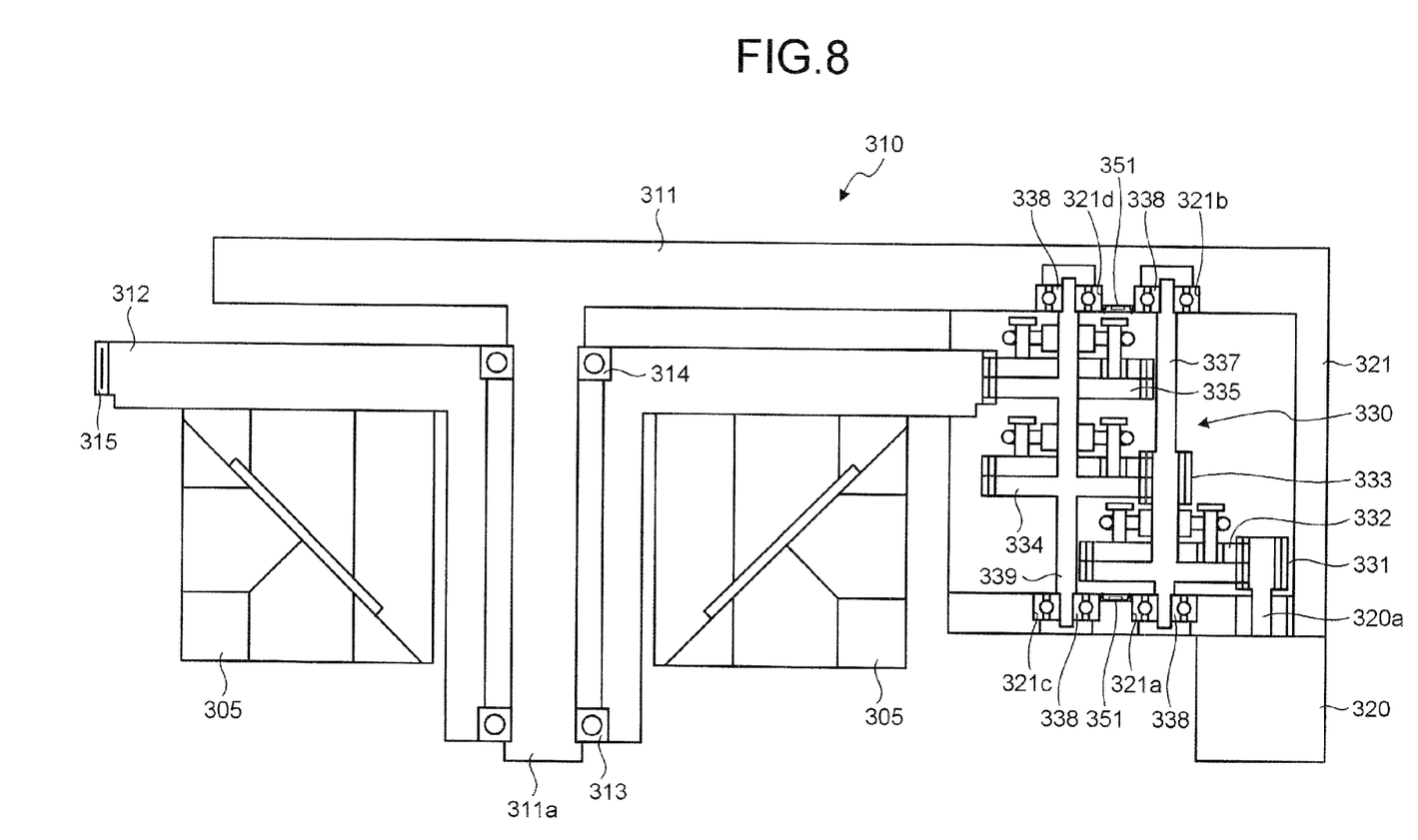
FIG. 8 is a side cross-sectional diagram of a mechanical configuration of a turret apparatus in accordance with a third embodiment of the present invention.
Figure 9:
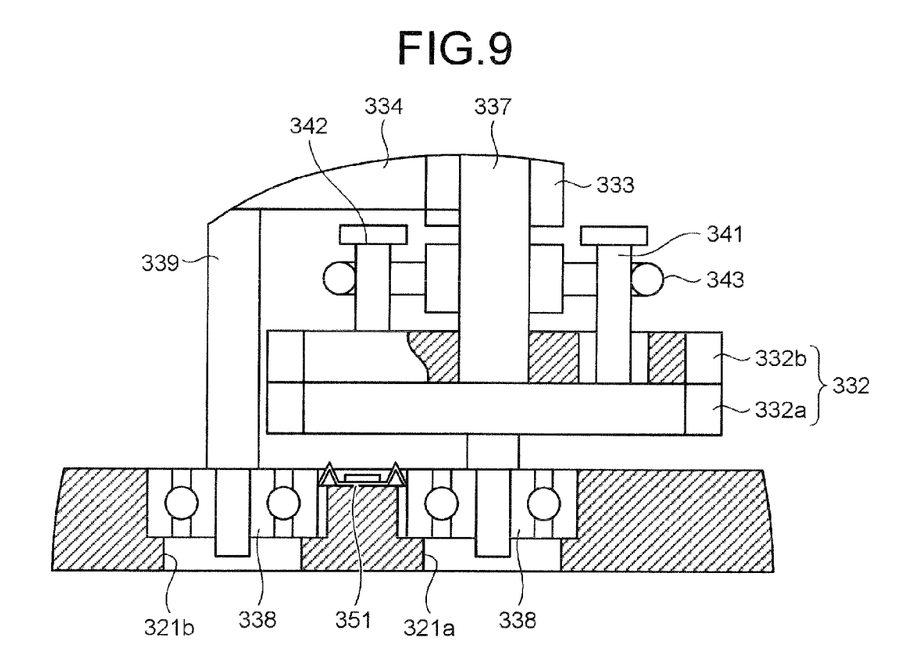
FIG. 9 is an enlarged view for illustrating main parts of the turret apparatus shown in FIG. 8.
Figure 10:
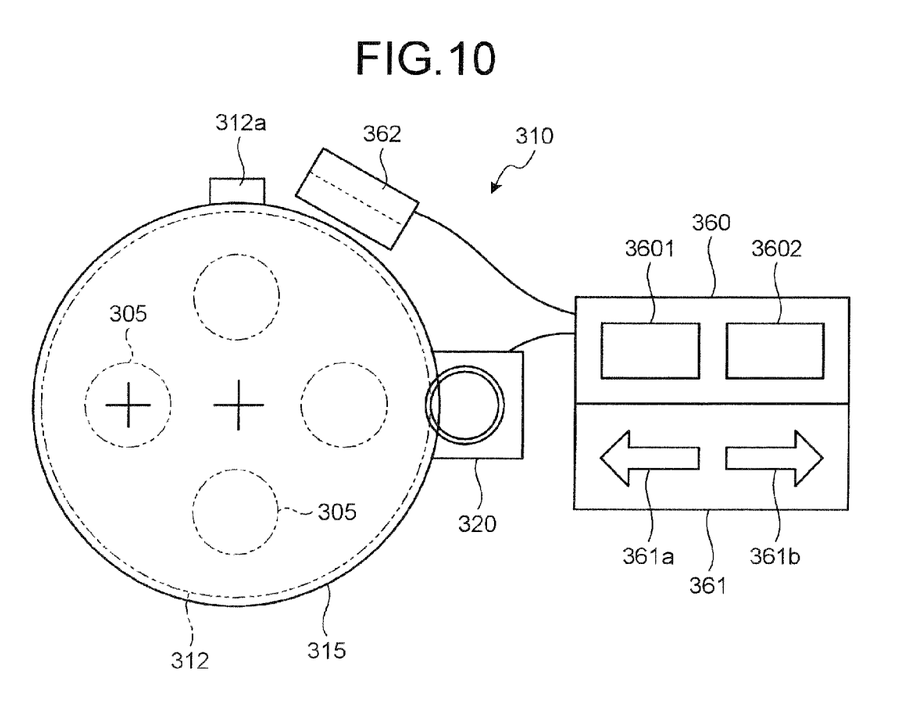
FIG. 10 is a conceptual diagram of an electric configuration of the turret apparatus shown in FIG. 8.

A turret apparatus in accordance with a third embodiment is described with reference to FIG. 8. FIG. 8 is a side cross-sectional diagram of a mechanical configuration of a turret apparatus in accordance with the third embodiment of the present invention. FIG. 9 is an enlarged view for illustrating main parts of the turret apparatus shown in FIG. 8. FIG. 10 is a conceptual diagram of an electric configuration of the turret apparatus shown in FIG. 8.

A turret apparatus 310 in accordance with the third embodiment of the present invention is called an electric turret in which mirror cubes 305 can be switched using a driving motor 320. As shown in FIG. 8, the turret apparatus 310 includes a body (fixed part) 311, a turret 312, the driving motor 320 and a gear apparatus 330.

The body 311 is attached to a stage included in the microscope body. A shaft 311a is extended vertically downward from the body 311. Turrets 312 are attached to the shaft 311a using bearings 313 and 314 in a manner such that the turret 312 is rotatable in relation with the body 311.

Four mirror cubes 305 are attached to the turret 312 in the turret apparatus 310 in accordance with the third embodiment. Specifically, the mirror cubes 305 are attached to the turret 312 at regular intervals and at positions in the same radius from the rotation axis of the turret 312. Therefore, when the turret 312 is rotated one-fourth revolution in the clockwise (CW) direction or in the counterclockwise (CCW) direction, the mirror cubes 305 are switched.

A driven gear 315 is formed on the outer circumference of the turret 312. The number of teeth of the driven gear 315 is divisible by the number of attached mirror cubes 305. In the third embodiment, the driven gear 315 has the number of teeth that is divisible by four.

Furthermore, the driving motor 320 is attached to the body with a frame 321 interposed inbetween. The driving motor 320 is a hybrid-type step motor that rotates in synchronization with pulse voltage. In the third embodiment, a step angle is 1.8 degrees and thus an output shaft 320a is rotated one complete revolution per 200 steps (pulses).

The gear apparatus 330 is arranged between the driving motor 320 and the turret 312, transmits power from the driving motor 320 to the turret 312 (the driven gear 315), and is contained in the frame 321. The gear apparatus 330 includes gears 331, 332, 333, 334, and 335 (315) and transmits the rotation of the driving motor 320 to the turret 312 at reduced rotation speed. Specifically, the gear apparatus 330 includes a motor gear 331, a first main gear 332, a first small gear 333, a second main gear 334, and an output gear 335.

The motor gear 331 is attached to the output shaft 320a of the driving motor 320. Specifically, the motor gear is a spur gear having ten teeth.

The first main gear 332 is engaged with the motor gear 331. Specifically, the first main gear 332 is a spur gear having forty teeth. Therefore, when the motor gear 331 is rotated, the first main gear 332 is rotated one-fourth revolution. When the motor gear 331 is rotated four revolutions, the first main gear 332 is rotated one revolution (thus speed slows down to one-fourth). The same teeth of the first main gear 332 are engaged with the same teeth of the motor gear 331, respectively. The first main gear 332 is attached to a first slowdown shaft 337. The first main gear 332 is rotated together with the first slowdown shaft 337.

The first slowdown shaft 337 is a stepped shaft whose both ends are narrow. The first slowdown shaft 337 is rotatably supported by the frame 321. Specifically, stepped holes containing radial hearings 338 are made in the frame 321 that supports the first slowdown shaft 337. The ends of the first slowdown shaft 337 are pressed into the inner rings of the radial hearings 338 contained in stepped holes 321a and 321b (interference fit).

The first small gear 333 rotates in the same manner with the first main gear 332. Specifically, the first small gear 333 is a spur gear having ten teeth. The first small gear 333 is attached to the first slowdown shaft 337, similarly to the first main gear 332. The first small gear 333 rotates together with the first slowdown shaft 337.

The second main gear 334 is engaged with the first small gear 333. Specifically, the second main gear 334 is a spur gear having forty teeth. Therefore, when the first small gear 333 is rotated one revolution, the second main gear 334 is rotated one-fourth revolution. When the first small gear 333 is rotated four revolutions, the second main gear 334 is rotated one revolution (thus speed slows down to one-fourth). The same teeth of the second main gear 334 are engaged with the same teeth of the first small gear 333, respectively. The second main gear 334 is attached to a second slowdown shaft 339. The second main gear 334 rotates together with the second slowdown shaft 339.

Similarly to the first slowdown shaft 337, the second slowdown shaft 339 is a stepped shaft whose both ends are narrow and is rotatably supported by the frame 321. Specifically, stepped holes 321c and 321d containing the radial bearings 338 are made in the frame 321 that supports the second slowdown shaft 339. The ends of the second slowdown shaft 339 are pressed into the inner rings of the radial hearings 338 contained in the stepped holes 321c and 321d (interference fit).

The output gear 335 rotates in the same manner with the second main gear 334 and is engaged with the driven gear 315. Specifically, the output gear 335 is a spur gear having forty teeth. Therefore, when the output gear 335 is rotated one revolution, the driven gear 315 (the turret 312) is rotated one-fourth revolution (thus speed slows down to one-fourth) so that the mirror cube 305 is switched to the adjacent mirror cube 305. Furthermore, when the output gear 335 is rotated four revolutions, the driven gear 315 (the turret 312) is rotated one revolution. The same teeth of the driven gear 315 are engaged with the same teeth of the output gear 335, respectively. The output gear 335 is attached to the second slowdown shaft 339, similarly to the second main gear 334. The output gear 335 rotates together with the second main gear 334.

When the motor gear 331 is rotated sixteen revolutions in the gear apparatus 330 described above, the first main gear 332 and the first small gear 333 are rotated four revolution, the second main gear 334 and the output gear 335 are rotated one revolution, and the driven gear 315 (the turret 312) is rotated one-fourth revolution, so that the mirror cube 305 is switched to the adjacent mirror cube 305.

Furthermore, the gear apparatus 330 includes a backlash reduction system that reduces backlash. The backlash reduced is looseness between tooth surfaces of a pair of engaged gears (the motor gear 331 and the first main gear 332, the first small gear 333 and the second main gear 334, and the output gear 335 and the driven gear 315) and looseness between the inner ring and the outer ring of the radial bearing 338.

Firstly, a backlash reduction system that reduces looseness between tooth surfaces of a pair of engaged gears is described. In the backlash reduction system, at least one of the gears of the gear apparatus 330 includes two gears stacked one on another and one of the stacked gears is shifted along a rotation direction. In the third embodiment, this backlash reduction system is applied to the first main gear 332, the second main gear 334, and the output gear 335. As shown in FIG. 9, the first main gear 332, for example, includes a fixed gear 332a that is fixed to the first slowdown shaft 337, and a rotating gear 332b that has the same configuration as the fixed gear 332a and can be rotated around the first slowdown shaft 337. Connection pins 341 and 342 arranged upright in the respective gears are linked together with an elastic component 343 (e.g., tension coiled spring). The elastic component 343 is set so that greater force than resisting force by the rotated turret 312 and moment of the mirror cube attached to the turret 312 works. The elastic component 343 reduces looseness with the teeth surface of a paired, engaged gear (e.g., the motor gear 331, the first small gear 333, and the driven gear 315).

Secondly, the backlash reduction system that reduces looseness between the inner ring and the outer ring of the bearing is described. This backlash reduction system presses the first slowdown shaft 337 into the inner ring of the radial bearing 338 as described and applies force to the outer ring of the radial bearing 338 in a radial direction. For example, as shown in FIG. 9, the backlash reduction system includes an elastic component (e.g., plate spring) 351 that is located and screwed on a groove between the outer ring of the radial bearing 338 supporting the first slowdown shaft 337 and the outer ring of the radial bearing 338 supporting the second slowdown shaft 339. The elastic component 351 applies force to the radial bearing 338 supporting the first slowdown shaft 337 and the radial bearing 338 supporting the second slowdown shaft 339 in such directions that the radial bearings 338 are urged to be separated. Being preloaded by the urging force, the outer ring of the radial bearing 338 changes its shape elastically. Thus, looseness between the inner, ring and the outer ring of each of the radial bearings 338 is reduced.

The turret apparatus 310 of the microscope configured as above is controlled by a controller 360 as shown in FIG. 10. The controller 360 includes an input unit 361 and is connected with an origin-point sensor 362 and with the driving motor 320 described above. The input unit 361 receives inputs of commands for a switching operation of the mirror cubes 305. As shown in FIG. 10, the input unit 361 includes a pair of arrow keys 361a and 361b. The origin-point sensor 362 detects an origin point that is used as reference as to where the turret 312 is stopped. Specifically, the origin-point sensor 362 is a photo interrupter. The origin-point sensor 362 uses as reference a light-blocking plate 312a attached to the turret 312 and regards as an origin point a position where the light is blocked by the light-blocking plate 312a.

Furthermore, the controller 360 includes a calculator 3601 and a storage 3602. The calculator 3601 calculates the number of steps (the number of pulses) to be output to the driving motor 320. The storage 3602 stores the number of steps (the number of pulses) that have been output to the driving motor 320. Specifically, the storage 3602 stores the number of steps, regarding steps for rotating the driving motor 320 in the counterclockwise direction as positive and steps for rotating the driving motor 320 in the clockwise direction as negative. The calculator 3601 identifies a current position based on the number of steps stored in the storage 3602 and controls the driving motor 320 based on the number of steps calculated.

As for the number of steps for switching the mirror cubes 305, the number of steps required from the origin point until the optical axis of the mirror cube 305 reaches the observation optical axis is measured before the shipment of the microscope and the measured number is adopted. In this manner, mechanical fluctuation, e.g., fluctuation in engagement of gears, can be avoided so that mirror cubes can be properly switched.

When the turret apparatus 310 of the microscope described above is turned on, the controller 360 starts an initializing process. The initializing process is performed so that a position where the turret 312 is stopped corresponds to the number of steps stored in the storage 3602. The calculator 3601 rotates the turret 312 in the clockwise direction and regards as the origin point the position where the origin-point sensor 362 detects the light-blocking plate 312a. Then, the calculator 3601 assigns zero to the number of steps stored in the storage 3602. The rotation speed of the driving motor 320 during the initializing process is lower than the rotation speed in switching the mirror cubes 305 so that fluctuation in the position detected by the origin-point sensor 362 is suppressed and thus detection accuracy is improved.

When the initializing process is completed, the turret apparatus 310 of the microscope is switched to a normal operation mode, in which the calculator 3601 switches the mirror cubes 305 according to an input from the input unit 361. The driving motor 320 is driven according to the operation of the arrow keys 361a and 361t so that the turret 312 is rotated.

When the arrow keys 361a and 361b are operated, the calculator 3601 calculates difference between the number of steps stored in the storage 3602 and the number of steps corresponding to a switching command, outputs the difference to the driving motor 320, and stores the number of steps corresponding to the switching command in the storage 3602. The driving motor 320 is rotated by the number of steps being input and then stops (open-loop control).

According to the turret apparatus 310 of the microscope described above, the backlash reduction system that reduces looseness between tooth surfaces of a pair of engaged gears is applied to the first main gear 332, the second main gear 334, and the output gear 335, so that the looseness between tooth surfaces in the gear apparatus 330 is reduced as much as possible. Furthermore, the position where the turret 312 stops is not deviated due to load caused by the turret 312 and the mirror cubes 305.

Furthermore, the backlash reduction system that reduces looseness between the inner ring and the outer ring of the radial bearing 338 is applied to the first slowdown shaft 337 and the second slowdown shaft 339, so that the looseness between the inner ring and outer ring of the radial bearing 338 in the gear apparatus 330 is reduced. As a result, shaking of the first slowdown shaft 337 and the second slowdown shaft 339 can be suppressed, and the radial bearing 338 becomes more rigid.

Furthermore, the number of steps required from the origin point until the optical axis of the mirror cube 305 reaches the observation optical axis is measured before the shipment of the microscope. According to this number, the mirror cubes 305 are switched, so that mechanical fluctuation, e.g., fluctuation in engagement of gears, can be avoided and the mirror cubes can be properly switched.

Furthermore, the driving motor 320 is rotated by the number of steps that is input and then stops. In this manner, it is not required to detect a stopping position with the slow-speed rotation of the driving motor 320, and therefore the mirror cubes 305 can be switched (i.e., the turret can be rotated) at high speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical-device switching apparatus of a microscope, comprising:
   a driving motor;
   a rotation unit that is rotatably attached to a body and to which optical devices of the microscope are attached so that the optical devices are switched when the rotation unit is rotated; and
   a gear apparatus that is arranged between the driving motor and the rotation unit and transmits power from the driving motor to the rotation unit,
   wherein the gear apparatus includes a backlash reduction system, in which at least one gear of the gear apparatus includes two gears stacked one on another, and one of the two stacked gears is shifted along a rotation direction to reduce backlash.

2. The optical-device switching apparatus according to claim 1, wherein the gear apparatus includes:
   a bearing that rotatably supports a shaft to which at least one gear of the gear apparatus is attached, and
   a frame that contains the bearing, and
   wherein the backlash reduction system applies force to an outer ring of the bearing in a radial direction.

3. The optical-device switching apparatus according to claim 1, wherein the gear apparatus includes:
   a bearing that rotatably supports a shaft to which at least one gear of the gear apparatus is attached, and
   a frame that contains the bearing, and
   wherein the backlash reduction system applies force to the shaft in a radial direction.

4. The optical-device switching apparatus according to claim 1, wherein the driving motor is a step motor that rotates in synchronization with pulse voltage, and
   wherein the driving motor includes:
      a number-of-step calculating unit that calculates a number of steps required for the driving motor to move the rotation unit from a stopping position to a next stopping position, and
      a driving unit that drives the driving motor according to the number of steps calculated by the number-of-step calculating unit.

5. The optical-device switching apparatus according to claim 3, further comprising an origin-point detector that detects an origin point used as a reference for a stopping position of the rotation unit.

6. An optical-device switching apparatus of a microscope, comprising:
   a driving motor;
   a rotation unit that is rotatably attached to a body and to which optical devices of the microscope are attached so that the plurality of optical devices are switched when the rotation unit is rotated;
   a gear apparatus that is arranged between the driving motor and the rotation unit and transmits power from the driving motor to the rotation unit; and
   a backlash reduction system that applies a unidirectional rotative force to the rotation unit while the driving motor is inactive.

7. The optical-device switching apparatus according to claim 6, wherein the driving motor is a step motor that rotates in synchronization with pulse voltage, and
   wherein the driving motor includes:
      a number-of-step calculating unit that calculates a number of steps required for the driving motor to move the rotation unit from a stopping position to a next stopping position, and
      a driving unit that drives the driving motor according to the number of steps calculated by the number-of-step calculating unit.

8. The optical-device switching apparatus according to claim 7, further comprising an origin-point detector that detects an origin point used as a reference for a stopping position of the rotation unit.

9. The optical-device switching apparatus according to claim 6, wherein the backlash reduction system comprises:
   a rotative force generating gear that applies the unidirectional rotative force to the rotation unit when the optical devices of the microscope are switched; and
   a weight that is arranged on the rotative force generating gear at a position away from a rotation center of the rotative force generating gear.

10. The optical-device switching apparatus according to claim 9, wherein a rotation axis of the rotative force generating gear is tilted, and
    wherein a gravity force of the weight generates the unidirectional rotative force that is applied by the rotative force generating gear to the rotation unit.

11. The optical-device switching apparatus according to claim 2, wherein the backlash reduction system comprises a pressing component that presses the outer ring of the bearing.

12. The optical-device switching apparatus according to claim 3, wherein the backlash reduction system comprises a pressing component including a tip end that supports a member such that the member applies force to the shaft.

* * * * *